(12) United States Patent
Burton et al.

(10) Patent No.: US 8,691,056 B2
(45) Date of Patent: Apr. 8, 2014

(54) METHOD AND APPARATUS FOR SEPARATING FLUID MIXTURES

(75) Inventors: Sam J. Burton, Lee's Summit, MO (US); Dick Burton, Kingsville, MO (US)

(73) Assignee: Distillation Technologies, Inc., Lee's Summit, MO (US)

(*) Notice: Subject to any disclaimer, the term of this patent is extended or adjusted under 35 U.S.C. 154(b) by 783 days.

(21) Appl. No.: 12/758,338

(22) Filed: Apr. 12, 2010

(65) Prior Publication Data

US 2010/0264013 A1 Oct. 21, 2010

Related U.S. Application Data

(60) Provisional application No. 61/170,303, filed on Apr. 17, 2009.

(51) Int. Cl.
| | |
|---|---|
| *B01D 1/14* | (2006.01) |
| *B01D 1/16* | (2006.01) |
| *B01D 3/10* | (2006.01) |
| *B01D 3/26* | (2006.01) |
| *B01D 3/34* | (2006.01) |

(52) U.S. Cl.
USPC ............. 203/49; 203/22; 203/78; 203/80; 203/90; 203/91; 203/93; 159/4.01; 159/4.06; 159/16.1; 159/48.2; 159/DIG. 16; 95/175; 261/128; 261/148; 568/916

(58) Field of Classification Search
USPC .......... 159/4.01, 4.06, 4.1, 16.1, 48.1, 48.2, 159/DIG. 16; 203/18, 22, 49, 78, 80, 90, 91, 203/98, DIG. 13, DIG. 16; 95/44, 175, 254; 261/128, 147, 148; 568/916
See application file for complete search history.

(56) References Cited

U.S. PATENT DOCUMENTS

| | | | | |
|---|---|---|---|---|
| 4,422,903 A * | 12/1983 | Messick et al. | ................ | 203/19 |
| 4,600,477 A * | 7/1986 | Higashi et al. | .................. | 203/26 |
| 5,227,018 A * | 7/1993 | Bro et al. | ..................... | 159/4.02 |
| 5,624,534 A * | 4/1997 | Boucher et al. | ............... | 202/153 |
| 6,699,369 B1 * | 3/2004 | Hartman et al. | ................ | 203/11 |
| 6,783,601 B2 * | 8/2004 | Gray et al. | ...................... | 134/10 |
| 6,797,125 B2 * | 9/2004 | Honkanen et al. | ............. | 203/71 |
| 6,942,798 B2 * | 9/2005 | Miller, III | ...................... | 210/603 |
| 7,198,254 B2 * | 4/2007 | Holloway et al. | ............ | 261/36.1 |
| 7,316,781 B2 * | 1/2008 | Radomyselski et al. | ...... | 210/631 |
| 7,357,849 B2 * | 4/2008 | Wright | ............................ | 203/10 |
| 7,628,893 B1 * | 12/2009 | Bonser et al. | ..................... | 203/2 |
| 7,771,567 B2 * | 8/2010 | Rives et al. | .................. | 202/176 |
| 7,955,864 B2 * | 6/2011 | Cox et al. | ...................... | 436/180 |
| 2003/0108823 A1 * | 6/2003 | Muraoka et al. | ............. | 430/329 |
| 2006/0120213 A1 * | 6/2006 | Tonkovich et al. | ........... | 366/144 |

* cited by examiner

*Primary Examiner* — Virginia Manoharan
(74) *Attorney, Agent, or Firm* — Hovey Williams LLP

(57) ABSTRACT

A system and method for separating a fluid mixture is provided which employ vacuum distillation apparatus, and optionally, gas-handling apparatus operable to introduce a gas into the liquid mixture prior to being dispersed within the vacuum distillation apparatus. The liquid mixture is dispersed within the vacuum distillation apparatus as micro-sized droplets. When used, the gas that has been introduced into the liquid mixture is rapidly liberated from the micro-sized droplets thereby causing the droplets to break into still smaller droplets thereby maximizing the vaporization of the more volatile components in the liquid mixture.

20 Claims, 1 Drawing Sheet

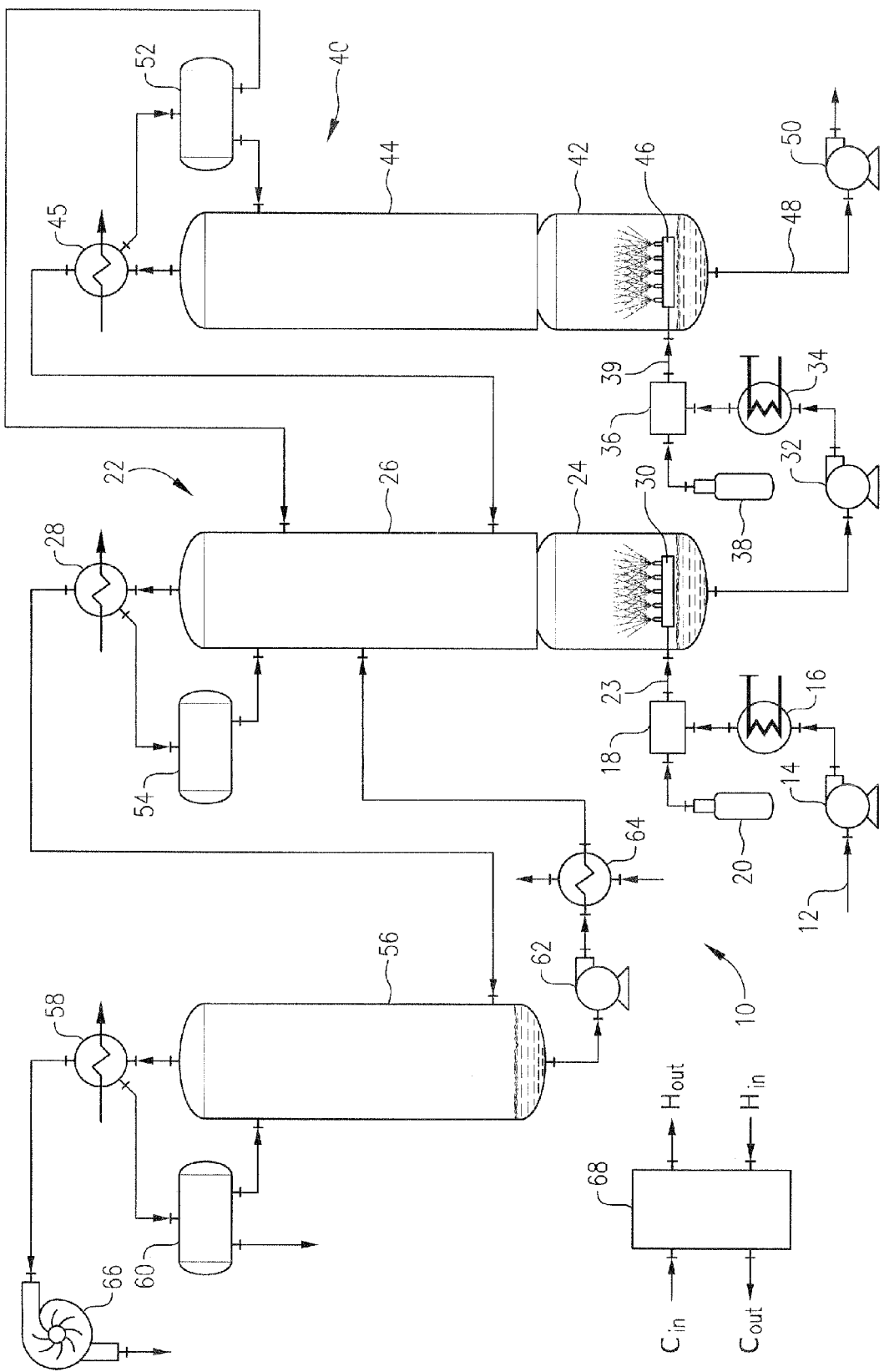

METHOD AND APPARATUS FOR SEPARATING FLUID MIXTURES

RELATED APPLICATION

The present application claims the benefit of U.S. Provisional Patent Application No. 61/170,303, filed Apr. 17, 2009, which is incorporated by reference herein in its entirety.

BACKGROUND OF THE INVENTION

1. Field of the Invention

The apparatus and methods described herein are useful for separating fluid mixtures. In one embodiment, the apparatus and method can be used to separate a fluid stream comprising water and alcohol into at least one stream comprising primarily alcohol and one stream comprising primarily water. The separation is accomplished through the use of one or more vacuum distillation steps.

2. Description of the Prior Art

Water and alcohol mixtures form hydrogen bonds in the liquid and on the surface. The surface bonding force is surface tension and in normal distillation processes the escaping alcohol vapors and water vapors need to have enough energy to overcome the surface tension forces (including the chamber pressure). The vapor force needed to overcome the surface tension force is also referred to as vapor pressure. Vapor can escape the liquid when vapor pressure inside the liquid is greater than the surface tension forces. As one would expect, increasing the temperature of a liquid increase the liquids vapor pressure. Boiling begins when the vapor pressure exceeds the surface tension forces.

In standard distillation strippers, the trays used to separate the alcohol from the beer are at different temperatures and concentrations of alcohol. The beer in the tray has a depth and a flat surface. The flat surface indicates the surface tension is fixed and constant. The deeper the liquid in the tray the higher the vapor pressure has to be to form a bubble, or there needs to be movement of the fluid in the tray to place an alcohol molecule nearer the surface, reducing the required vapor pressure. The vaporizing process on each tray is in equilibrium and the standard alcohol water vapor-liquid-equilibrium (V-L-E) curve describes the process well. In order to break the alcohol-water azeotrope and recover a highly enriched alcohol distillate, the distillation environment must be changed so as to cause the beer not to follow V-L-E curve behavior.

SUMMARY OF THE INVENTION

In one embodiment of the present invention there is provided a system for separating a mixture of at least two liquids having different boiling points. The system comprises a supply conduit operably connected with a source of the liquid mixture. The conduit carries the liquid mixture into primary distillation apparatus where it is dispersed. The primary distillation apparatus includes a primary vacuum chamber, a primary rectifier column, and a primary condenser. The system further comprises bottoms distillation apparatus operably connected with the primary distillation apparatus. The bottoms distillation apparatus includes a bottoms vacuum chamber, a bottoms rectifier column, and a bottoms condenser. The primary vacuum chamber is operably connected with the bottoms vacuum chamber by a bottoms conduit carrying a bottoms stream from the primary vacuum chamber for dispersion within the bottoms vacuum chamber. The bottoms condenser is operably connected with the primary lower rectifier column to deliver a vapor stream from the bottoms distillation apparatus to the primary distillation apparatus. Vacuum apparatus is connected with the primary and bottoms distillation apparatus for generating vacuum conditions therein.

In another embodiment of the present invention there is provided a system for separating a mixture of at least two liquids having different boiling points. The system comprises a supply conduit operably connected with a supply of the liquid mixture. Gas handling apparatus is connected with the supply conduit and operable to introduce a gas into the liquid mixture. The system further comprises primary distillation apparatus into which the liquid mixture from the gas handling apparatus is dispersed. The primary distillation apparatus includes a primary vacuum chamber, a primary rectifier column, a secondary rectifier column, a primary condenser, and a secondary condenser. The primary condenser is operably connected with the secondary rectifier column to deliver a vapor stream from the primary condenser to the secondary rectifier column. Vacuum apparatus is operably connected with the primary distillation apparatus for generating a vacuum therein.

In yet another embodiment of the present invention there is provided a method for separating a mixture of at least two liquids having different boiling points. The method comprises introducing a gas into a feed stream of the mixture and subsequently directing the gas-containing mixture into primary distillation apparatus operating under vacuum conditions. Within the primary distillation apparatus, the mixture is separated into a primary vapor stream predominantly comprising the vapor of the liquid having the lower boiling point and a primary bottoms stream predominantly comprising the liquid having the higher boiling point. The bottoms stream is removed from the primary distillation apparatus, and a bottoms gas is introduced into the bottoms stream. The gas-containing bottoms stream is directed into bottoms distillation apparatus operating under vacuum conditions. Within the bottoms distillation apparatus, the gas-containing bottoms stream is separated into a secondary vapor stream predominantly comprising the vapor of the liquid having the lower boiling point and a secondary bottoms stream predominantly comprising the liquid having the higher boiling point. The secondary vapor stream from the bottoms distillation apparatus is combined with the primary vapor stream. At least a portion of the combined vapor stream is condensed to form an enriched condensate.

BRIEF DESCRIPTION OF THE DRAWING

FIG. 1 schematically depicts a vacuum distillation apparatus in accordance with one embodiment of the present invention.

DETAILED DESCRIPTION OF THE PREFERRED EMBODIMENT

Systems and methods according to the present invention are directed toward separating mixtures of two or more liquids into a low-boiling point liquid stream, predominantly comprising the most volatile liquid of the mixture, and a high-boiling point liquid stream, predominantly comprising the least volatile liquid of the mixture. The apparatus and methods described herein are particularly suited for separating alcohol and water mixtures in an energy efficient manner when compared to traditional methods. The energy savings afforded by the present invention allow for the recovery of relatively pure alcohol streams for a fraction of the cost as other traditional methods. In one embodiment according to the present invention, the recovered alcohol stream comprises at least 90% alcohol, or at least 95% alcohol, or even at least 99% alcohol.

Although the methods and apparatus described herein are not limited to alcohol and water mixtures, in certain embodiments the alcohol to be separated from the aqueous mixture is selected from the group consisting of C1-C12 alcohols, diols, polyols and combinations thereof. In particular embodiments, the alcohol selected from the group consisting of methanol, ethanol, propanol, butanol, and combinations thereof. While the method and apparatus can be configured to be used with any relative concentration of alcohol in the water mixture, in certain embodiments the mixture comprises less than about 25%, or less than about 20%, or even less than about 13% alcohol (weight basis) with the balance comprising substantially water. In other embodiments, such as when the mixture comprises ethanol, the alcohol and water mixture comprises between about 0.5-50%, or between about 1-25%, or even between about 1.5-13% by weight alcohol.

The methods and apparatus may also be employed in the separation of other materials from fluid mixtures such as volatile organic compounds and finely divided and dispersed solid materials, as would occur during water remediation operations.

As shown in FIG. 1, a liquid mixture, such as a beer ethanol mixture obtained from a fermentation process, is delivered from a source to a separation system 10 by a primary main pump 14. In certain embodiments, the mixture is optionally directed through a primary heater 16 where its temperature is raised. As explained below, pre-heating the liquid mixture can help facilitate separation of the more volatile component in the liquid mixture.

In certain embodiments according to the present invention, the liquid mixture is then passed through gas-handling apparatus, depicted in FIG. 1 as a gas diffuser 18 that is operably connected to a supply of gas 20. Gas diffuser 18 operates to introduce a gas into the liquid, which, as explained in greater detail below, also helps facilitate separation of the more volatile component in the liquid mixture. In particular embodiments, the gas introduced into the liquid mixture by diffuser 18 is carbon dioxide; however it is within the scope of the present invention to utilize other gases as well. In other embodiments, the gas used is capable of dissolving into the liquid mixture. The quantity of gas to be introduced into the liquid mixture can vary depending upon the composition of the liquid mixture and other operating conditions within separation system 10. In certain embodiments, the gas can be present in the liquid mixture at levels well below saturation or the liquid mixture can be saturated with the gas.

After passing through diffuser 18, the gas-containing liquid mixture is directed toward primary distillation apparatus 22 via conduit 23. Primary distillation apparatus generally comprises a primary vacuum chamber 24, a primary rectifier column 26, and a primary condenser 28. The liquid mixture is dispersed within vacuum chamber by a nozzle assembly 30 comprising one or more nozzles operable to generate a fine spray of the liquid. In certain embodiments, spraying the liquid mixture results in the generation of an aerosol of micro-sized droplets. The spray forms droplets that have a distribution of sizes. The small droplet projectile in primary vacuum chamber 24 has no gravitational mass placing pressure on it as does the depth of liquid in a traditional distillation tray. The droplet reduces the amount of vapor pressure required to form bubbles compared to tray liquids. Surface tension forces cause the droplets to be spherical. The surface tension on a large droplet is essentially the same as the surface tension on the liquid surface of a tray. However, as droplets get smaller surface tension starts to decrease, due to curvature of the droplet surface. This effect generally takes place at very small droplet sizes.

Vacuum chamber 24, which can be insulated and/or heated, operates under vacuum conditions, which in certain embodiments, is between about 27-28 in Hg of vacuum. With reference to these conditions, the liquid, gas-infused mixture is generally at a superheated condition. With many polar liquids, especially water and alcohol mixtures, the normal making and breaking of hydrogen bonds gives a liquid the characteristics of a fluid. Lowering the temperature of water causes the water molecules vibration to slow down and results in fewer hydrogen bonds being broken. At the opposite end of the spectrum, where the mixture is superheated, the molecular vibrations are high and hydrogen bonds between the alcohol and water are broken. Care must be taken when selecting the conditions within which spraying of the particles occurs because at too low of a temperature, not all of the alcohol vaporizes, but at too high a temperature all the alcohol vaporizes but so does an unnecessary amount of additional water.

The positive pump pressure on the mixture holds the diffused gases, which also includes some alcohol and some water in vapor form, in the liquid mixture. Thus, the superheated temperature for a particular process is a function of the pressure within primary vacuum chamber 24 and the concentration levels of the various components making up the liquid mixture.

Upon entering primary vacuum chamber 24, the pressure acting on the liquid droplets falls considerably and there is no longer enough force to hold the gases suspended in the liquid and tiny bubbles start to form inside the droplet. As the liquid and droplets transition from high pressure (pump) to low pressure (chamber) the bubbles (from the diffused gases, alcohol vapors and some water vapors) grow. As the pressure continues to decreases the bubbles grow larger until the bubbles start to fill the droplet. The size of the droplet starts to grow as the displaced liquid has no other place to go but to the surface. As the vapor bubbles and droplet expand fewer hydrogen bonds are holding the water surface molecules to the other water molecules just under the surface. As the droplet continues to expand fewer internal water molecules are available to bond and a point is reached where the expanding bubble pressures overwhelm the surface tension forces and the droplet literally explodes. This releases the diffused gases, all the alcohol vapors and some water vapors. This explosion process releases all the vapors at one time and is an entirely different mechanism for releasing vapors than the classical V-L-E curve mechanism.

After the explosion the liquid left form extremely small droplets. These extremely small droplets have a smaller surface tension as discussed earlier. If there is any leftover liquid alcohol its vapor pressure in the extremely small droplets is greater than the reduced surface tension forces and it escapes the liquid using the classical V-L-E method (albeit, with reduced surface tension). These two steps release all the alcohol and some of the water vapor within 250 milliseconds of being sprayed. The vapors concentrations released follow liquid concentrations levels on the V-L-E curve at the process temperature.

In certain embodiments according to the present invention, only small amounts of diffused gas, $CO_2$ for example, are used where the alcohol concentrations are higher (approximately 15% for a water-ethanol mixture) as the droplets are assured to have enough ethanol (or other VOCs) in the droplet for the bubble count to be high enough to overcome the surface tension and explode. Theoretically, there is a homogeneous mixture of alcohol and water, where alcohol is found in every droplet, at the concentration level of the mixture; however, there may actually be a distribution of droplets where some have smaller concentration levels and others higher levels. By adding diffused gas a second distribution of droplets containing the diffused gas is established. The overlap between these two distributions will even out the number of gas molecules (diffused gas, alcohol and water vapor) in the droplet in order for it to explode. When small alcohol concentrations are being distilled, more diffused gases are used to assure there are enough bubbles to break the surface tension and release the vapors.

As explained below, liquid reflux from primary rectifier column 26 flows downwardly into the primary vacuum chamber 24. In certain embodiments, a majority, if not all, of the more volatile components in the reflux vaporize prior to re-entering primary vacuum chamber 24. However, small to trace amounts of the more volatile components (i.e., the alcohol in the case of an alcohol-water feed) may not vaporize and be collected in the bottom of primary vacuum chamber 24 along with an portions of the sprayed initial liquid mixture not vaporized in the primary vacuum chamber. This bottoms liquid is collected and discharged from primary vacuum chamber 24 using a bottoms pump 32. While the bottoms from primary vacuum chamber 24 generally contains only a relatively minor amount of the more volatile components present in the initial liquid mixture feed (in some embodiments less than about 2 or 3% by weight based on the total weight of the bottoms stream in the case of an alcohol-water mixture), it may be desirable to recover as much of these volatile components as possible. Therefore, in certain embodiments the bottoms stream is fed through a bottoms heater 34 and/or bottoms gas-handling apparatus which comprises bottoms gas diffuser 36 and gas source 38. Diffuser 36 may operate in essentially the same manner as gas diffuser 18, and in particular embodiments operates to deliver $CO_2$ into the bottoms stream.

The bottoms stream is then delivered, via conduit 39, to bottoms distillation apparatus 40 which comprises a bottoms vacuum chamber 42, a bottoms rectifier column 44, and a bottoms condenser 45. Bottoms vacuum chamber 42 may be configured similar to primary vacuum chamber 24, in that it too may be insulated and/or heated and comprise a nozzle assembly 46 comprising one or more nozzles operable to generate a fine spray of the bottoms liquid. In bottoms vacuum chamber 42 substantially all of the more volatile components, alcohol for example, is vaporized. The bottom stream 48 of the bottoms vacuum chamber 42 predominantly comprises the less volatile components (i.e., those having a higher boiling point), mostly water and only trace amounts of alcohol, for example, ethanol. Bottoms stream 48 is discharged from system 10 using a discharge pump 50.

The vapor rich in the more volatile components generated in bottoms vacuum chamber 42 is drawn up into bottoms rectifier column 44. Bottoms rectifier column 44 may contain a packing material or distillation trays which provide a surface area for further mass transfer and separation of the more volatile components (e.g., alcohol) from the less volatile components (e.g., water). The volatiles-rich vapor stream continues through bottoms rectifier column and enters bottoms condenser 45 in which a portion of the volatiles-rich vapor is condensed. The liquid condensate from bottoms condenser 45 may be stored in bottoms reflux tank 52 until it is refluxed to bottoms rectifier column 44 and/or the primary rectifier column 26 at an appropriate entry point within the respective rectifier column.

The vapor rich in volatiles from primary vacuum chamber 24 is drawn by vacuum up into the primary rectifier column 26. Primary rectifier column may also contain a packing material or distillation trays to assist in separation of the more volatile components in the vapor. Upon entering the primary rectifier column 26, the volatiles-rich vapor from primary vacuum chamber 24 is combined with the volatiles-rich vapor exiting bottoms condenser 45. The merged volatiles-rich vapor stream is drawn through primary rectifier column 26 in which the vapor stream contacts liquid reflux fed to primary rectifier column 26 by one or more reflux streams. Upon exiting primary rectifier column 26, the volatiles-rich vapor enters primary condenser 28 wherein a portion of the volatiles-rich vapor is condensed. This condensate may be stored in reflux tank 54 until it is refluxed to primary rectifier column 26.

The vapor exiting primary condenser 28 is directed toward a secondary rectifier column 56 that may be configured similar to primary rectifier column 26. In secondary rectifier column 56 further separation of the more volatile components from less volatile components occurs. The highly enriched vapor exiting secondary rectifier column 56 is directed to a secondary condenser 58 wherein the vapor stream, now comprising essentially all of the more volatile components (e.g., at least about 99% by weight alcohol in certain embodiments) is substantially entirely condensed. A portion of the condensate from condenser 58 is stored in secondary reflux tank 60 until it is refluxed back to secondary rectifier column 56. Any refluxed liquid reaching the bottom of secondary rectifier column 56 may be collected and refluxed to primary rectifier column 26 by a rectifier pump 62. A chiller 64 may be used to cool the refluxed bottoms from secondary rectifier column 56.

Any uncondensed materials (primarily air) exiting secondary condenser 58 are discharged to the atmosphere after passing through vacuum apparatus 66, which may comprise one or more vacuum pumps. One or more check valves (not shown) may be installed on either the upstream or downstream sides of the vacuum apparatus 66 to prevent leakage into the system while the vacuum pump is shut down. Vacuum apparatus 66 is employed to generate vacuum conditions favorable to effect separation of the volatile components in both primary distillation apparatus 22, bottoms distillation apparatus 40, and secondary rectifier column 56. In certain embodiments, such vacuum conditions are generally between about 27-28 in. Hg of vacuum, which permits the various processes occurring within separation system 10 to be carried out at temperatures ranging from about 32° F. to about 105° F., more preferably from about 60° F. to about 105° F.

These relatively low operating temperatures permit a heat pump 68 to be used to supply the necessary heating or refrigeration used in the various heat exchangers of system 10 (e.g., heaters 16, 34, condensers 28, 45, 58, and chiller 64) thereby resulting in further energy savings.

In certain applications, it may be discovered that some portions of system 10 are not essential to recovering a distillate product having the desired purity. For example, in some embodiments, it may be discovered that bottoms distillation apparatus 40 may be omitted or taken off-line. In such instance, the bottoms stream from primary vacuum chamber 24 can simply be discarded. In other embodiments, it may be discovered that secondary rectifier column 56 is not required to achieve a distillate product having the desired purity. In that instance, a distillate may be recovered from primary condenser 28.

It is recognized that various pieces of equipment may be redundantly installed to allow for servicing of the equipment while keeping the overall system operational. For example, multiple vacuum pumps could be installed in parallel. The plurality of pumps may all be utilized during start up of the system, and once a steady state is achieved, one or more pumps could be switched off to reduce operating costs and allow for equipment servicing. Further, additional heat pumps may be utilized to supply the necessary heating and refrigeration. Electric heaters may also be used in place of or to supplement the energy from heat pump 68.

We claim:

1. A method for separating a liquid from a liquid mixture comprising:
    directing a feed stream of said liquid mixture through gas-handling apparatus including a gas diffuser operably connected to a supply of a gas, introducing said gas from said gas diffuser into said liquid mixture and causing said gas to become dissolved in said liquid mixture thereby forming a gas-containing mixture, and subsequently directing said gas-containing mixture into distillation apparatus operating under vacuum conditions;
    within said distillation apparatus said gas-containing mixture is dispersed as micro-sized droplets and separated into a vapor stream and a liquid bottoms stream;
    removing said bottoms stream from said distillation apparatus;
    condensing at least a portion of said vapor stream to form a condensate; and
    recovering said condensate.

2. The method according to claim 1, wherein the step of dispersing said gas-containing mixture within said distillation apparatus includes spraying said gas-containing mixture from one or more nozzles located within said distillation apparatus.

3. The method according to claim 1, wherein said micro-sized droplets of said gas-containing mixture comprise an aerosol.

4. The method according to claim 1, wherein said gas introduced into said feed stream comprises carbon dioxide.

5. The method according to claim 1, wherein said liquid mixture is pre-heated prior to introduction of said gas.

6. The method according to claim 1, wherein said bottoms stream comprises finely divided or dispersed solid materials originally contained in said feed stream.

7. The method according to claim 1, wherein said liquid mixture comprises at least two liquids having different boiling points.

8. The method according to claim 7, wherein said feed stream is heated prior to being directed into said distillation apparatus, wherein heat is removed from said vapor stream during said condensing step, and wherein the heat removed from the vapor stream is used to supply heat to said feed stream.

9. The method according to claim 8, wherein said vapor stream predominantly comprises the vapor of the liquid having the lower boiling point, and wherein said bottoms stream predominantly comprises the liquid having the higher boiling point.

10. The method according to claim 9, wherein said method further comprises introducing a bottoms gas into said bottoms stream and causing said bottoms gas to become dissolved in said bottoms stream thereby forming a gas-containing bottoms stream and directing said gas-containing bottoms stream into a bottoms distillation apparatus operating under vacuum conditions.

11. The method according to claim 10, wherein said bottoms stream is heated prior to introduction into said bottoms distillation apparatus.

12. The method according to claim 9, wherein said method further comprises, within said bottoms distillation apparatus, separating said gas-containing bottoms stream into a bottoms distillation apparatus vapor stream predominantly comprising the vapor of the liquid having the lower boiling point and a bottoms distillation apparatus bottoms stream predominantly comprising the liquid having the higher boiling point.

13. The method according to claim 12, wherein said method further comprises combining said bottoms distillation apparatus vapor stream with said vapor stream to form a combined vapor stream.

14. The method according to claim 13, wherein said condensing step comprises condensing at least a portion of said combined vapor stream to form an enriched condensate.

15. The method according to claim 14, wherein said condensing step comprises removing heat from said combined vapor stream, and wherein said heat removed from said combined vapor stream is used to supply heat to the feed stream and said bottoms stream.

16. The method according to claim 14, wherein said liquid mixture comprises an alcohol and water.

17. A method for separating a liquid from a liquid mixture comprising:
    introducing a gas into a feed stream of said liquid mixture and subsequently directing said gas-containing mixture into distillation apparatus operating under vacuum conditions, wherein said feed stream is heated prior to being directed into said distillation apparatus;
    within said distillation apparatus said gas-containing mixture is dispersed as micro-sized droplets and separated into a vapor stream and a bottoms stream;
    removing said bottoms stream from said distillation apparatus;
    condensing at least a portion of said vapor stream to form a condensate by removing heat therefrom, the heat removed from said vapor stream is used to supply heat to heat said feed stream;
    recovering said condensate;
    introducing a bottoms gas into the bottoms stream thereby forming a gas-containing bottoms stream, wherein said bottoms stream is pre-heated prior to introduction of said bottoms gas;
    directing said gas-containing bottoms stream into a bottoms distillation apparatus operating under vacuum conditions.

18. A method for separating a liquid from a liquid mixture comprising:
    introducing a gas into a feed stream of said liquid mixture and subsequently directing said gas-containing mixture into distillation apparatus operating under vacuum conditions, wherein said feed stream is heated prior to being directed into said distillation apparatus;
    within said distillation apparatus said gas-containing mixture is dispersed as micro-sized droplets and separated into a vapor stream and a bottoms stream;
    removing said bottoms stream from said distillation apparatus;
    heating said bottoms stream and introducing a bottoms gas into the bottoms stream thereby forming a gas-containing bottoms stream;
    directing said gas-containing bottoms stream into a bottoms distillation apparatus operating under vacuum conditions;
    within said bottoms distillation apparatus, separating said gas-containing bottoms stream into a bottoms distillation apparatus vapor stream and a bottoms distillation apparatus bottoms stream;
    combining said vapor stream with said bottoms distillation apparatus vapor stream to form a combined vapor stream;

condensing at least a portion of said combined vapor stream to form an enriched condensate;

refluxing at least a portion of said enriched condensate to said distillation apparatus, and directing said uncondensed vapor to a rectifier wherein said uncondensed vapor is further enriched.

19. The method according to claim 18, wherein said further enriched vapor is condensed and recovered.

20. A method for separating a liquid from a liquid mixture comprising:

directing a feed stream of said liquid mixture through gas-handling apparatus including a gas diffuser operably connected to a supply of a gas, introducing gas from said gas diffuser into said liquid mixture and causing said gas to become dissolved in said liquid mixture thereby forming a gas-containing mixture, and subsequently directing said gas-containing mixture into distillation apparatus operating under vacuum conditions;

within said distillation apparatus operating under vacuum conditions dispersing said gas-containing mixture as micro-sized droplets and causing the gas that was previously introduced into said liquid feed stream to form vapor bubbles within said droplets until the vapor pressure of the vapor bubbles exceeds the surface tension of the droplets thereby causing the vapor bubbles to be rapidly liberated from the droplets, said gas-containing mixture thereby being separated into a vapor stream and a liquid bottoms stream;

removing said bottoms stream from said distillation apparatus;

condensing at least a portion of said vapor stream to form a condensate; and recovering said condensate.

* * * * *